Patented Apr. 18, 1950

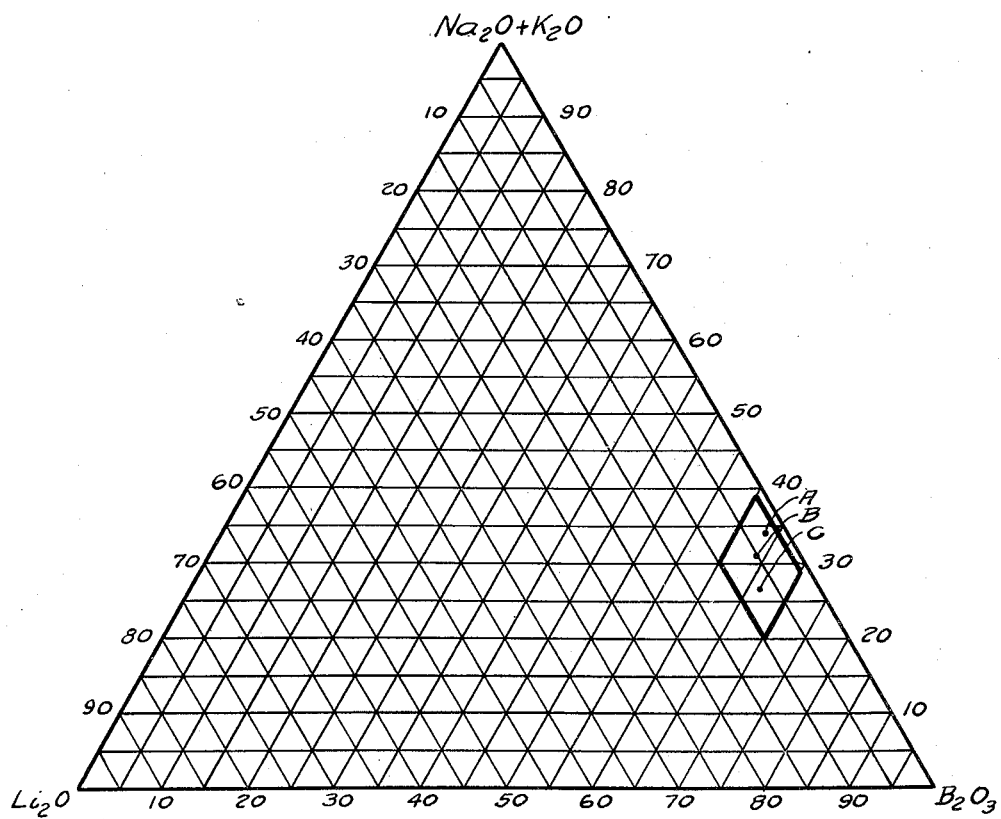

2,504,802

UNITED STATES PATENT OFFICE 2,504,802

BRAZING FLUX

Joseph G. Christ, Pittsburgh, Pa., and Russell L. Ferguson, Bronx, N. Y., assignors to Westinghouse Electric Corporation, East Pittsburgh, Pa., a corporation of Pennsylvania Application September 27, 1944, Serial No. 555,976

6 Claims. (Cl. 148—26)

This invention relates to fluxes, more particularly fluxes that fuse at the temperatures employed in hard soldering.

The function of a brazing flux is to dissolve oxides and other surface impurities that may be present on metals that are to be brazed. Generally, the brazing flux is applied to the metal and the metal heated to a temperature corresponding to that at which the brazing operation is to be carried out, at which temperature the flux becomes liquid and dissolves surface oxides and impurities on the surface of the metal being treated. The requirements for a good flux are that it have a low enough melting point to become fluid at the required brazing temperature and that the flux be of sufficiently low viscosity at the brazing temperature that it will be extremely active and function rapidly.

Within recent years there have been available to the trade many brazing alloy compositions that have a relatively low melting temperature whereby brazing may be carried out expeditiously and without the use of relatively high temperatures. Such alloys as copper-phosphorus, copper-phosphorus-silver and similar low temperature brazing compositions melting in a temperature range of about 600° C. to 700° C. have been widely employed because of their low melting temperature and ease of application. Low brazing temperatures are desirable since heating is both faster and easier and undue oxidation is avoided.

The available fluxes suitable for carrying out brazing operations with these low temperature brazing alloys have been found defective on several grounds. One of the difficulties has been the fact that the fluxes did not melt readily at the low brazing temperatures and required a higher temperature than necessary to melt the brazing alloy. In some cases the flux was viscous and sluggish at the melting point and had to be superheated in order to secure adequate fluidity and reaction. The temperatures required for the fluxing to occur were excessive.

A particularly undesirable feature associated with many of the available fluxes was their toxic nature due to the fact that fluorides were present. Fluorides have been applied in combination with other ingredients since they have been regarded as necessary to give a low fusion temperature, but during the fusion the fluoride fumes attacked the eyes, nose, throat and any other moist portion of the workmen's body. Breathing fluoride fumes resulted in serious organic troubles. Painful ulcers frequently formed on the hands of the workers. Even with elaborate and expensive ventilating equipment, health hazards were still encountered in using these materials.

The further defect associated with fluoride fluxes is that the residue of the flux after brazing is hygroscopic and corrosive to the metal on which it may be present. In order to overcome this problem, it has been necessary to remove the flux by a difficult and careful cleansing treatment of one kind or another.

The object of this invention is to provide for a low viscosity brazing flux of relatively low fusion temperature that is non-toxic and non-corrosive.

A further object of this invention is to provide a paste-like flux composition that has a low viscosity when fused.

Other objects of the invention will in part be obvious and will in part appear hereinafter.

For a fuller understanding of the nature and objects of the invention, reference should be had to the following detailed description and drawing, in which the figure is a triaxial chart plotting respectively boron oxide, lithium oxide, and sodium and potassium oxides.

According to the invention, it has been discovered that a four-component flux of boron oxide, lithium oxide, sodium oxide and potassium oxide melts at a low brazing temperature, is highly fluxing to surface oxides and metals, is non-corrosive and is non-toxic.

Referring to the triaxial diagram in the drawing, there is plotted the range of compositions of the components that have been found satisfactory for the practice of the invention. The composition within the parallelogram shown is that of the fused flux. In general, it has been found that a composition containing from 60 to 70% boron oxide ($B_2O_3$), ½ of 1% to 10% of lithium oxide ($Li_2O$) and the balance consisting essentially of sodium oxide and at least 7% of potassium oxide ($Na_2O+K_2O$) will give good results as a flux. The sodium oxide may vary up to 23% of the composition while the potassium oxide may vary from 7% to 35% of the composition. All percentages are by weight.

Typical examples of flux of this invention are as follows:

Example I

| | Per cent |
|---|---|
| $B_2O_3$ | 63.1 |
| $Na_2O$ | 15.4 |
| $K_2O$ | 19.6 |
| $Li_2O$ | 1.9 |

This example corresponds to point A in the drawing.

Example II

| | Per cent |
|---|---|
| $B_2O_3$ | 64.1 |
| $Na_2O$ | 10.2 |
| $K_2O$ | 20.8 |
| $Li_2O$ | 4.9 |

This composition corresponds to point B in the drawing.

Example III

| | Per cent |
|---|---|
| $B_2O_3$ | 65.7 |
| $Na_2O$ | 10.9 |
| $K_2O$ | 16.5 |
| $Li_2O$ | 6.9 |

This corresponds to point C in the drawing.

The flux compositions enclosed within the rectangle shown in the triaxial drawing may be prepared from a variety of materials. A particularly satisfactory procedure is to combine alkali hydroxides with boric acid. Thus boric acid may be combined with sodium hydroxide, potassium hydroxide and lithium hydroxide. A convenient way of preparing the composition is to dissolve the required quantity of boric acid and the alkali hydroxides in hot water in an amount just sufficient to dissolve the solids. When cooled to room temperature, a thick paste of uniform consistency is formed. The paste may be placed within cans or the like and is ready for use at any time.

Example IV

| | Pounds |
|---|---|
| Borax | 16.35 |
| Boric acid | 8.5 |
| KOH | 4.04 |
| $LiOH.H_2O$ | .945 | are dissolved in the order listed in 1⅔ gallons (13.8 lbs.) of water held in a kettle near the boiling point. When completely dissolved, the contents of the kettle are cooled while being stirred continuously. As cooling takes place fine crystals form and the mixture thickens. More water, up to about one gallon, may be added if required, from time to time to make the paste-like mixture easier to handle.

In preparing the flux composition, boric acid and the appropriate alkali metal carbonates or nitrates may be dissolved in hot water and similarly cooled to produce a paste. The alkali metal metaborates and tetraborates, such, for example, as borax, may be dissolved in hot water in the same manner. In general, alkali salts that will decompose to produce the alkali oxide and volatile matter may be used for the practice of the invention.

Water may be present in the composition both as water of crystallization as well as free water to produce a paste having a consistency adapted to the desired application. The composition described herein does not crystallize into large crystals but remains in a fine crystalline condition. It is in an easily applied paste condition at all times.

The paste flux composition may be applied to steel, copper, copper alloys, ferrous metals of all kinds, and the like. Silver brazing alloys, phosphorus copper alloys, and other low temperature hard brazing alloys will be found to form excellent joints in combination with the flux of this invention. The melting point of the fluxes within the area shown in the parallelogram is of the order of 600 to 650° C.

Since certain changes may be made in the above invention and different embodiments of the invention could be made without departing from the scope thereof, it is intended that all matter contained in the above description or taken in connection with the accompanying drawings shall be interpreted as illustrative and not in a limiting sense.

We claim as our invention:

1. A brazing flux that is relatively non-toxic to the user, consisting of ingredients that at a fusion temperature of about 600° C. produce from 60% to 70% by weight of boron oxide, from ½ of 1% to 10% by weight of lithium oxide and the balance being at least 10.2% and not in excess of 23% by weight of sodium oxide and at least 7% by weight of potassium oxide, the ingredients being admixed with water to form a paste.

2. A brazing flux that is relatively non-toxic to the user consisting of oxygen containing compounds of boron, sodium, potassium and lithium in predetermined proportions and volatile material so that when subjected to fusion at brazing temperature there is produced a low viscosity fluid flux composed of from 60% to 70% by weight of boron oxide, from ½ of 1% to 10% by weight of lithium oxide and the balance being at least 10.2% and not in excess of 23% by weight of sodium oxide and at least 7% but not exceeding 35% by weight of potassium oxide.

3. A brazing flux that is relatively non-toxic consisting of oxygen containing compounds of boron, sodium, potassium and lithium and volatile material in predetermined proportions whereby when subjected to temperatures of about 600° C. a low viscosity fluid flux is produced, the fluid being composed of about 63.1% by weight of boron oxide, 15.4% by weight of sodium oxide, 19.6% by weight of potassium oxide and 1.9% by weight of lithium oxide.

4. A brazing flux that is relatively non-toxic consisting of oxygen containing compounds of boron, sodium, potassium and lithium and volatile material in predetermined proportions whereby when subjected to temperatures of about 600° C. a low viscosity fluid flux is produced, the fluid being composed of about 64.1% by weight of boron oxide, 10.2% by weight of sodium oxide, 20.8% by weight of potassium oxide and 4.9% by weight of lithium oxide.

5. A paste flux that is relatively non-toxic consisting of, in combination, boric acid, sodium hydroxide, potassium hydroxide, lithium hydroxide and water in such proportions that when heated to about 600° C., volatile matter is driven off and the composition fuses, the fusion product composed of from about 60% to 70% by weight of boron oxide, from about ½ of 1% to 10% lithium oxide and the balance being at least 10.2% and not in excess of 23% by weight of sodium oxide and at least 7% by weight of potassium oxide.

6. A paste flux consisting of, in combination, 16.35 parts by weight of borax, 8.5 parts by weight of boric acid, 4.04 parts by weight of potassium hydroxide, 0.945 part by weight of lithium hydroxide monohydrate and sufficient water to make a smooth paste.

JOSEPH G. CHRIST.
RUSSELL L. FERGUSON.

(References on following page)

REFERENCES CITED

The following references are of record in the file of this patent:

UNITED STATES PATENTS

| Number | Name | Date |
|---|---|---|
| 1,940,262 | Lytle | Dec. 19, 1933 |
| 2,296,442 | Horowitz | Sept. 22, 1942 |

FOREIGN PATENTS

| Number | Country | Date |
|---|---|---|
| 7,730 of 1911 | Great Britain | Mar. 28, 1912 |
| 10,108 of 1912 | Great Britain | Apr. 17, 1913 |
| 33,350 | Norway | Oct. 17, 1921 |